(12) United States Patent
Romano et al.

(10) Patent No.: US 10,506,069 B2
(45) Date of Patent: Dec. 10, 2019

(54) VIRTUAL PROFILE FOR BLUETOOTH

(71) Applicant: Microsoft Technology Licensing, LLC, Redmond, WA (US)

(72) Inventors: Anthony C Romano, Kirkland, WA (US); Brian Kai Peasley, Redmond, WA (US); Sean E Anderson, Redmond, WA (US); Timothy D Burrell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 15/672,076

(22) Filed: Aug. 8, 2017

(65) Prior Publication Data

US 2019/0052721 A1 Feb. 14, 2019

(51) Int. Cl.
| | | |
|---|---|---|
| *H04L 29/08* | (2006.01) | |
| *G06F 9/54* | (2006.01) | |
| *H04W 8/20* | (2009.01) | |
| *G06K 9/00* | (2006.01) | |
| *H04W 12/06* | (2009.01) | |
| *H04W 4/80* | (2018.01) | |
| *H04W 12/04* | (2009.01) | |
| *G10L 17/00* | (2013.01) | |

(52) U.S. Cl.
CPC ............ *H04L 67/306* (2013.01); *G06F 9/542* (2013.01); *G06K 9/00221* (2013.01); *H04L 67/303* (2013.01); *H04W 4/80* (2018.02); *H04W 8/205* (2013.01); *H04W 12/04031* (2019.01); *H04W 12/06* (2013.01); *G10L 17/00* (2013.01)

(58) Field of Classification Search
CPC ..... H04L 67/30; H04L 67/306; H04L 67/303; H04L 63/0876; H04L 63/0428; H04W 4/80; H04W 8/205; H04W 12/06; H04W 12/04; G06F 9/54; G06F 9/542; G06K 9/00221; G10L 17/00
USPC .......................................................... 709/204
See application file for complete search history.

(56) References Cited

U.S. PATENT DOCUMENTS

| | | |
|---|---|---|
| 7,260,638 B2 | 8/2007 | Crosbie |
| 7,912,020 B2 | 3/2011 | Khasawneh et al. |
| (Continued) | | |

FOREIGN PATENT DOCUMENTS

EP 2314090 A2 4/2011

OTHER PUBLICATIONS

"Sharing Bluetooth devices with a virtual machine (2005315)", https://web.archive.org/web/20141122112408/https://kb.vmware.com/selfservice/microsites/search.do?language=en_US&cmd=displayKC&externalId=2005315, Published on: Nov. 22, 2014, 4 pages.

(Continued)

*Primary Examiner* — Ruolei Zong

(74) *Attorney, Agent, or Firm* — Schwegman Lundberg & Woessner, P.A.

(57) ABSTRACT

Systems, methods, and computer-executable instructions for connecting devices includes receiving a device identifier associated with a second device. A search is initiated for a second device profile associated with the device identifier using the device identifier. The second device profile is received. The second device profile includes a device address and a link key. The link key was generated by a second device different from the first device. The address of the first device is set to the device address. Encrypted data is received from the second device addressed to the address.

19 Claims, 4 Drawing Sheets

(56) References Cited

U.S. PATENT DOCUMENTS

| | | | |
|---|---|---|---|
| 8,432,261 B2 | 4/2013 | Talty et al. | |
| 8,634,821 B2* | 1/2014 | Raleigh | H04L 41/0806 455/419 |
| 8,896,651 B2 | 11/2014 | Chu et al. | |
| 8,983,383 B1* | 3/2015 | Haskin | H04M 1/6041 455/41.2 |
| 2009/0006846 A1* | 1/2009 | Rosenblatt | G06F 21/35 713/159 |
| 2010/0255782 A1* | 10/2010 | Klemmensen | H04N 21/43637 455/41.2 |
| 2011/0028094 A1* | 2/2011 | Masuda | H04L 63/107 455/41.2 |
| 2012/0322376 A1 | 12/2012 | Couse | |
| 2013/0115880 A1* | 5/2013 | Dal Bello | H04L 67/303 455/41.2 |
| 2015/0334245 A1 | 11/2015 | Lin et al. | |
| 2016/0269979 A1* | 9/2016 | Ide | H04W 52/0219 |
| 2016/0309323 A1* | 10/2016 | Zarakas | H04W 12/06 |
| 2017/0270330 A1* | 9/2017 | Albrecht | H04W 4/80 |
| 2017/0286656 A1* | 10/2017 | Kohli | G06F 21/32 |

OTHER PUBLICATIONS

"International Search Report and Written Opinion Issued in PCT Application No. PCT/US2018/038653", dated Sep. 13, 2018, 10 Pages.

* cited by examiner

VIRTUAL PROFILE FOR BLUETOOTH

BACKGROUND

Bluetooth allows devices to pair together to transfer data. A Bluetooth device must pair with each device prior to transferring data. Accordingly, a Bluetooth device must separately pair with multiple devices before accessing services of each device. Successfully paired Bluetooth devices may bond together allowing secure future connections between those two devices without repeating the pairing process. Bonding between devices, however, still requires that a pairing process is successfully performed prior to bonding for each pair of devices.

DETAILED DESCRIPTION

Figure 1A:
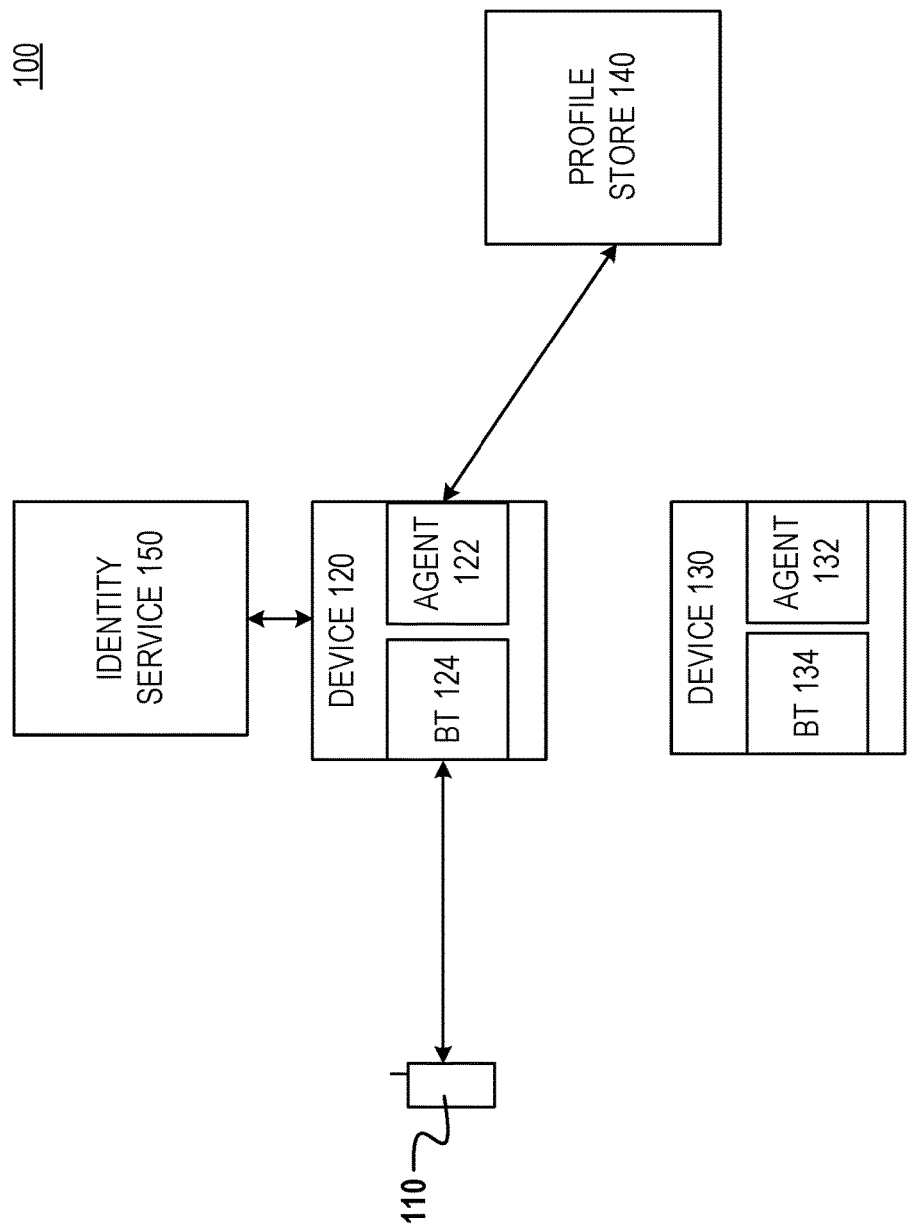
FIG. 1A is a block diagram of system for pairing devices using a virtual profile in accordance with respective examples.

Bluetooth devices can pair with one another to configure wireless communication between the devices. Pairing involves one device requesting to pair with another device. A link key is generated and used by both devices to encrypt communication between the devices. After successfully pairing, two devices may store the link key for future connections between the two devices. This is referred to as bonding the two devices together. Two devices that have previously successfully paired and bonded together are able to establish an encrypted connection without requiring another pairing process. The connection setup between two bonded devices is faster and more convenient for a user compared with repeating the pairing process. In current Bluetooth implementations, bonding is done between two specific devices. For each additional device, a separate pairing and bonding process must take place. Thus, there is a 1:1 binding between two devices.

Requiring pairing for each device can be problematic when a device may be able to connect to various different devices depending on the device's location. For example, an office that has multiple conference rooms, each room having conferencing equipment. Various disclosed embodiments allow a device to pair and bond with a single conferencing equipment. The device may then automatically connect and use any of the conferencing equipment throughout the office. The requirement of pairing with each conferencing equipment separately is removed.

In one embodiment, there are multiple conference rooms. The conference rooms may be in a single building, a single campus, or spread out geographically. Each room can have conferencing equipment. For example, the conferencing equipment may include a microphone, audio speakers, a video camera, a display screen, etc. The room may also be equipped with user identification equipment. For example, voice recognition, face recognition, login entry, etc. may be used to identify a user, and the user's device, that would like to use the conferencing equipment. In one embodiment, the user identification equipment is integrated into the conferencing equipment. The user identification may be associated with a user's device.

The conferencing equipment may include an agent that manages connections with devices. The agent may pair and bind with a Bluetooth device. This pairing and binding is the standard Bluetooth pairing and binding process. Thus, a link key is created for use by the paired devices. Each device learns the address of the other device and associates the link key with the address of the other device. For example, a user's device will learn the address of the agent or the conferencing equipment. The user's device will store a profile that associates the link key and a name with the address of the agent. The agent will also create a profile that includes the conferencing equipment's address, the user's device address and the link key. The agent may store the profile along with a device identifier in a profile store that is accessible to other agents. In an example, the device identifier may be received from the user identification equipment.

Once the user's device has successfully paired and bonded with one agent, the user's device may automatically connect with any other agent without requiring an additional pairing process. For example, a user's device may pair and bond with a first conference room. The user's device may be taken into a second conference room with different conferencing equipment. While the conferencing equipment may be different, the general functionality of the conferencing equipment is the same.

Upon entering a new conference room, user recognition equipment recognizes the user. In an example, facial recognition of the user is done and a user is identified. The user recognition equipment provides a user identifier. The agent in the new conference room receives the user identifier and searches the profile store for a profile for the user. If a profile is found, the profile is received by the agent. The profile has the address of the user's device and the address of the conferencing equipment that the user's device previously paired and bonded with. In addition, the profile has the link key created as part of the original pairing. The agent configures the conferencing equipment in the new conference room to have the address of the originally paired conferencing equipment from the user's profile. In addition, the agent configures the conferencing equipment to use the link key when communicating with the user's device. In an example, the addresses may be media access control (MAC) addresses.

The user's device or the conferencing equipment in the new conference room, may request a connection with the other device. For example, the user's device may request a connection to the conferencing equipment using standard Bluetooth procedures. The user's device will view the conferencing equipment in the new conference as being the same conferencing equipment previously paired and bonded with by the user's device. Accordingly, an additional pairing and bonding process is avoided. Thus, the agent provides the 1:1 pairing and bonding with the device. The agent virtualizes the binding, such that a user's device is able to bond with different conferencing equipment. In addition, because the agent keeps the 1:1 pairing, the user's device does not require any modification. A user's device, therefore, may take advantage of the agent and the virtual profile without requiring any software or hardware changes.

The user's device therefore may pair and bind with a single room and then may use the conferencing equipment in any of the conference rooms without needing to go through a separate pairing and binding process for each device, e.g., the conferencing equipment. The user's device may therefore use the conferencing equipment to use improved speakers/microphones, use the hands-free operation, and/or the call controls available through the conferencing equipment. In other examples, a user's device may pair with any Bluetooth compatible device. For example, two computing devices that are Bluetooth compatible may connect with one another. One of the two devices could use an agent to find the profile of the other computing device, thus, allowing the two devices to connect without requiring a separate pairing process. For example, a projector that is moved from room to room could have a profile. As the project enters a new room, conferencing equipment in each room may connect to the project using the projector's profile without requiring a separate pairing process for each room.

FIG. 1A is a block diagram of system 100 for pairing devices using a virtual profile in accordance with respective examples. A device 110 may be a Bluetooth device and request to pair with a device 120. The device 110 and the device 120 may be a computing device that includes support for Bluetooth communication, such as a mobile phone, a tablet, a laptop, a desktop, conferencing equipment, a file sharing system, a door lock, a microphone, one or more speakers, and the like. The device 120 and the device 130 each include a Bluetooth component 124 and 134 that handles Bluetooth communication with devices. The device 110 also includes a Bluetooth component, not shown. In an example, the device 110 is a user's device that may be a mobile phone, a tablet, a laptop, a desktop, and the like. The device 120 may be conferencing equipment, file sharing equipment, a door lock, or any equipment that has some functionality exposed through a Bluetooth connection.

The user's device 110 and the device 120 may pair and bind as known via the Bluetooth protocol. As part of the binding, the user's device 110 learns the address of the device 120 and the link key to use to communicate with the device 120. The user's device 110 may store the link key and the address of the device 120. The user's device 110 may use the stored link key and the address to communicate with the device 120 without requiring another paring and binding process.

In one embodiment, the device 120 or an agent 122 running on the device 120 may store the link key and the address of the device 120 in a profile associated with the user's device 110. In addition, the address of the user's device 110 may also be stored. In one embodiment, the profile is stored in a profile store 140. The profile store 140 may be a remote store, such as on a network storage or a cloud storage platform. In another example, the profile store 140 may be located on one or more agents. Agents may be configured to store and request profiles from the appropriate profile store. For example, an agent may be configured with a network address or host name of the profile store 140 to use.

In another embodiment, the profile is stored along with an identifier. The identifier may be an identifier of the user's device 110, such as a mobile identification number, international mobile subscriber identity (IMSI), a phone number, a WiFi MAC address, etc., to the device 120 or the agent 122. In an example, the user's device 110 runs an identifier service that provides the identity of the user's device to the device 120 or the agent 122. The identity service may provide a unique username, an email address, a mobile identification number, international mobile subscriber identity, a phone number, etc. In another embodiment, the identity service may use an authentication process, such as a user login, thumbprint, etc., to authenticate the user on the user's device 110. An indication of the authentication may be provided as the identifier. The device identifier may be provided through a data connection other than a Bluetooth connection.

In an example, the user's device 110 identifier is specific to the user of the device 110. For example, facial recognition and/or voice recognition may be used to generate the identifier. For example, the device 120 or the agent 122 may run the recognition software that provides the device identifier. In another example, an identity service 150 may provide the device identifier. In this example, the identity service 150 may provide the facial recognition, voice recognition, user input, etc., to the device 120 or the agent 122. The agent 122 uses the device identifier to store the profile of the user's device 110. The profile store 140 may associate the device identifier with the profile, allowing the user's device 110 profile to be accessed when the user's device 110 accesses a device with access to the profile storage 140.

The profile may also be stored along with a group identifier or a type of device. For example, a conference room may contain audio conferencing equipment and a file sharing system, each of which is accessible via a separate Bluetooth connection. A user's device, therefore, may be able to separately pair and bond with each device creating two different profiles. Each of these profiles may be stored in the profile storage 140 associated with both the user's device 110 identifier and a group identifier or a type of the device, e.g., audio conferencing or file sharing. In the above example, the type indicates if the profile is associated with the audio conferencing equipment or the file sharing system. When the user's device enters another room with either type of equipment, the agent will provide the appropriate group identifier to the profile storage 140 to retrieve the correct profile.

Figure 1B:
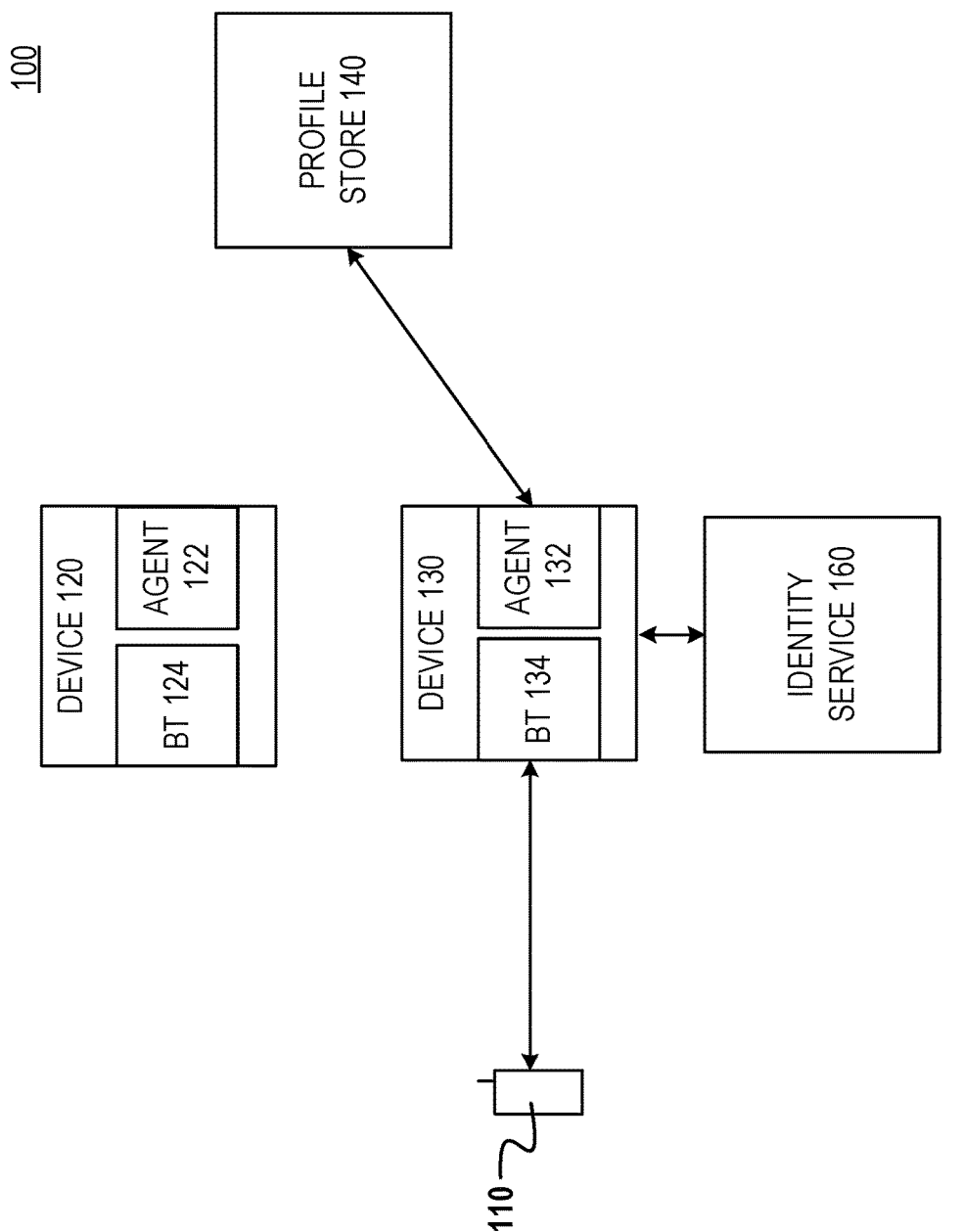
FIG. 1B is a block diagram of system for connecting devices using a virtual profile without requiring pairing in accordance with respective examples.

FIG. 1B is a block diagram of system for connecting devices using a virtual profile without requiring pairing in accordance with respective examples. After the user's device 110 has paired and bonded with device 120, the user's device 110 is able to connect with device 130 without requiring a separate pairing and bonding process with the device 130. Rather, the device 130 may take advantage of the corresponding user's profile stored in the profile store 140.

An identity service 160 may be used to provide a device identifier associated with the device 110. The device identifier will be the same device identifier provided by the identity service 150 from FIG. 1A. The device identifier may be generated in a similar manner as done by the identity service 150. The device identifier is provided to the device 130 or an agent 132 running on the device 130. The device 130 or the agent 132 searches the profile store 140 using the user's device 110 identifier. The profile storage 140 finds the profile that was stored when the user's device 110 paired and bonded with the device 120. The profile is returned to the device 130. To connect with the user's device 110 without requiring a new pairing and bonding process, the device 130 or the agent 132 uses the profile to configure the device 130. The device 130 is configured to use the address of the device 120 that is returned in the profile. This address is the address used by the device 120 when the user's device 110 paired and bonded with the device 120. After configuration, the device 130, therefore, appears to be the same as the device 120. In an example, the agent 132 creates the one-to-one bonding between the user's device 110 and the Bluetooth devices.

When the user's device 110 is connected to the device 130, the device 130 may reject connections from other devices. For example, a second device may have previously paired and bonded with the device 120. While the user's device 110 is connected to the device 130, the device 130 may block or reject any connection requests from the second device. Once the user's device 110 disconnects from the device 130, the second device may connect to the device 130 using the second device's profile. When the second device connects to the device 130, the device is configured based upon the second device's profile. This configuration may be different from the configuration from the profile associated with the user's device 110. For example, the address of the device 130 may be different based upon the address of the device that the second device originally paired and boned with. The agent and/or device, therefore, allow multiple different devices to connect without requiring separate pairing and bonding.

Figure 2:
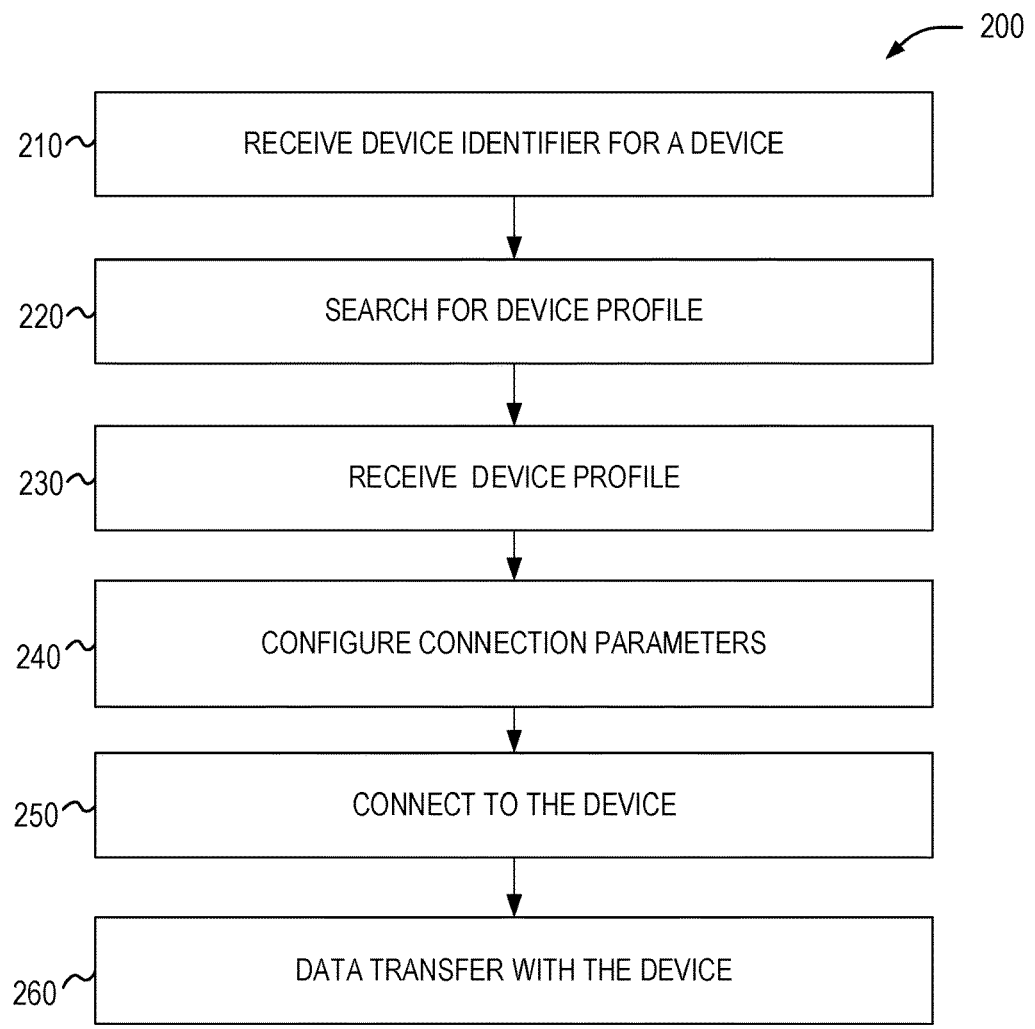
FIG. 2 is a flow diagram of a process for connecting devices using a virtual profile in accordance with respective examples.

FIG. 2 is a flow diagram of a process 200 for connecting devices using a virtual profile in accordance with respective examples. At 210, a receiving device, e.g., a Bluetooth device, receives a device identifier associated with a user device. The device identifier may be received directly from the user device. In an example, the device identifier is received by a different device or component. For example, a voice recognition system, a facial recognition system, a login system, etc. may provide the device identifier. At 220, the device identifier is used to search for a device profile associated with the user device. The device profile contains information that allows the receiving device and the user device to connect with one another without requiring both a pairing and a bonding process. The user device has previously successfully completed a pairing and bonding process with the receiving device or another device. The device profile contains the information that allows the receiving device to be configured to allow the user device to connect without requiring the additional pairing and bonding process.

At 230, the device profile is received by the receiving device. In an example, the device profile is received for a profile store. The profile store may be located on a same device as the agent, on another device, on a cloud system, etc. At 240, the receiving device uses the profile to configure itself. In an example, an agent uses the device profile to configure the receiving device. After configuration, the receiving device will be configured to look like the device the user device originally paired and bonded with. At 250, the receiving device and the user device establish a connection. The connection is established based upon the configured receiving device. The user device will look for a device having the address that is stored in the device profile. The receiving device will have this address after the receiving device is configured based upon the device profile. In addition, both the user device and the receiving device use the link key to encrypt the data. As the link key is stored both in the user device and the device profile, the link key does not need to be created or transferred between the devices.

At 260, data is transferred between the receiving device and the user device. In an example, the data is encrypted with the link key. The receiving device receives the link key from the device profile. The user device stored the link key that was received or created as part of the original pairing and bonding process. In an example, the link key is not regenerated or created as part of the second or later connections with devices. The user device, therefore, is able to connect with multiple different receiving devices based upon the virtual profile associated with the user device. In an example, an agent runs on each device or is able to access and configure each device which provides the one-to-one bonding between the user device and the other device. The user device, therefore, does not require any changes to take advantage of being able to access multiple devices without separate pairing and bonding processes.

Figure 3:
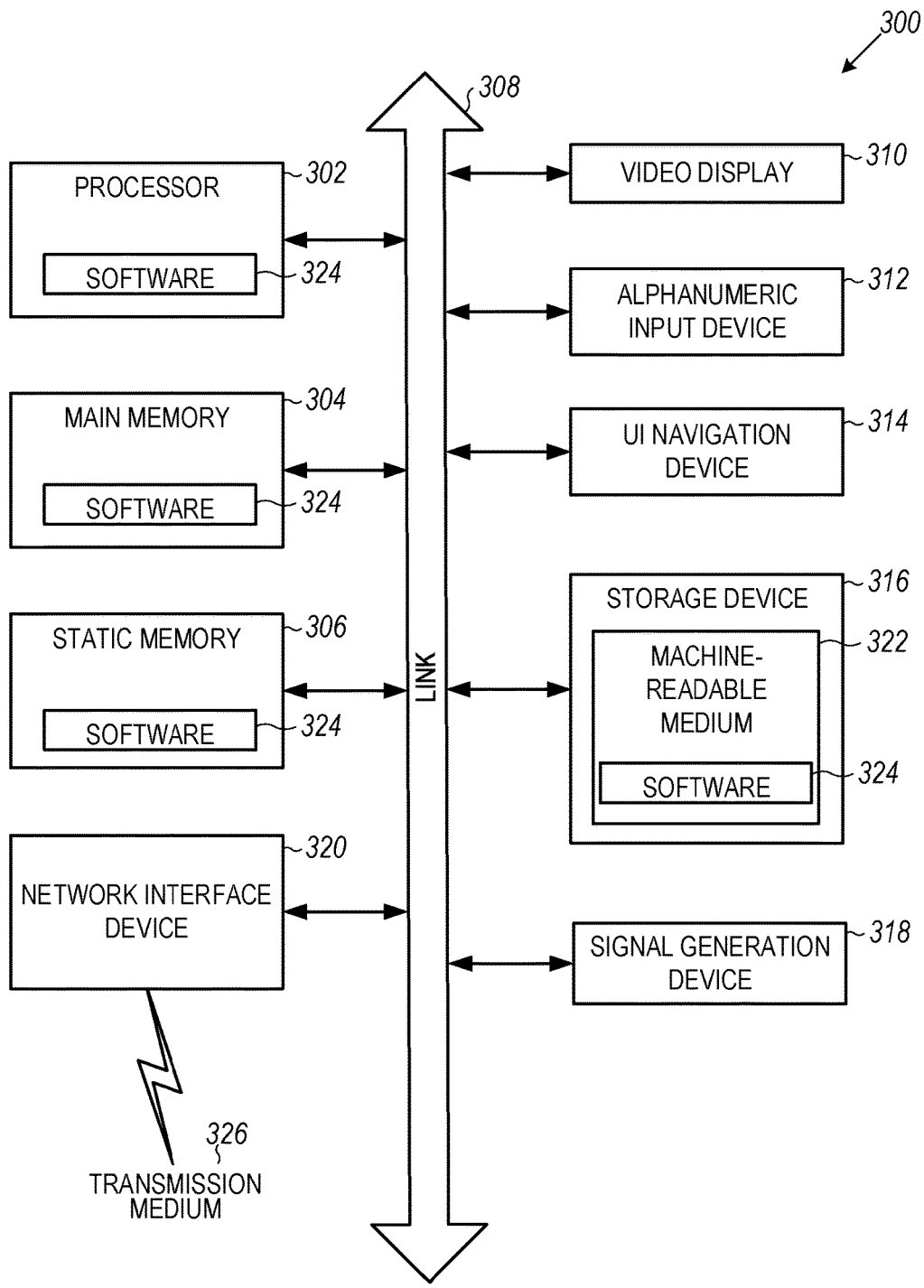
FIG. 3 is an example computing device that can be used in conjunction with the technologies described herein.

FIG. 3 is an example computing device that can be used in conjunction with the technologies described herein. In alternative embodiments, the computing device 300 may operate as a standalone device or may be connected (e.g., networked) to other computing devices. In a networked deployment, the computing device 300 may operate in the capacity of a server communication device, a client communication device, or both in server-client network environments. In an example, the computing device 300 may act as a peer computing device in peer-to-peer (P2P) (or other distributed) network environment. The computing device 300 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of device 110, 120, 130, and may implement the profile store 140, and perform the method of FIG. 2.

Computing device 300 may include a hardware processor 302 (e.g., a central processing unit (CPU), a graphics processing unit (GPU), a hardware processor core, or any combination thereof), a main memory 304 and a static memory 306, some or all of which may communicate with each other via a link (e.g., bus) 308. The computing device 300 may further include a display unit 310, an input device 312 (e.g., a keyboard), and a user interface (UI) navigation device 314 (e.g., a mouse). In an example, the display unit 310, input device 312, and UI navigation device 314 may be a touch screen display. In an example, the input device 312 may include a touchscreen, a microphone, a camera (e.g., a panoramic or high-resolution camera), physical keyboard, trackball, or other input devices.

The computing device 300 may additionally include a storage device (e.g., drive unit) 316, a signal generation device 318 (e.g., a speaker, a projection device, or any other type of information output device), a network interface device 320, and one or more sensors 321, such as a global positioning system (GPS) sensor, compass, accelerometer, motion detector, or other sensor. The computing device 300 may include an input/output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 316 may include a computing-readable (or machine-readable) storage media 322, on which is stored one or more sets of data structures or instructions 324 (e.g., software) embodying or utilized by any one or more of the techniques or functions described herein. In an example, at least a portion of the software may include an operating system and/or one or more applications (or apps) implementing one or more of the functionalities described herein.

The instructions 324 may also reside, completely or at least partially, within the main memory 304, within the static memory 306, and/or within the hardware processor 302 during execution thereof by the computing device 300. In an example, one or any combination of the hardware processor 302, the main memory 304, the static memory 306, or the storage device 316 may constitute computing device (or machine) readable media.

While the computer-readable storage media 322 is illustrated as a single medium, a "computer-readable storage media" or "machine-readable storage media" may include a single medium or multiple media (e.g., a centralized or distributed database, and/or associated caches and servers) configured to store the one or more instructions 324.

In an example, a computer-readable storage media or machine-readable storage media may include any medium that is capable of storing, encoding, or carrying instructions for execution by the computing device 300 and that cause the computing device 300 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 320 may use the transfer protocols to transmit data using transitory propagating signals.

In an example, the network interface device 320 may include one or more physical jacks (e.g., Ethernet, coaxial, or phone jacks) or one or more antennas to connect to the communications network 326. In an example, the network interface device 320 may include one or more wireless modems, such as a Bluetooth modem, a Wi-Fi modem or one or more modems or transceivers operating under any of the communication standards mentioned herein. In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques. In an example, a transmission medium may include any intangible medium that is capable of storing, encoding or carrying instructions for execution by the computing device 300, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for connecting a first device to a second device, the method performed by the first device and comprising:
   receiving a user identifier from user recognition equipment;
   in response to receiving the user identifier, initiating a search for a profile associated with a previous pairing of the second device to a third device, using the user identifier;
   in response to the search, obtaining the profile, the profile comprising an address of the third device and a link key, the link key associated with the third device;
   setting an address of the first device to the third device address; and
   receiving encrypted data, the encrypted data encrypted using the link key, from the second device addressed to the third device address.

2. The method of claim 1, wherein the user recognition equipment comprises a fourth device configured to perform image recognition of a user.

3. The method of claim 1, further comprising setting a name of the first device, the profile comprising the name.

4. The method of claim 1, wherein the initiating the search uses a group identifier, the profile associated with the group identifier.

5. The method of claim 1, wherein the first device and the second device are Bluetooth devices.

6. The method of claim 1, the address of the third device is a media access control (MAC) address.

7. The method of claim 1, further comprising:
   encrypting data using the link key; and
   sending, from the first device, the encrypted data to the second device.

8. The method of claim 1, further comprising:
receiving a request from a fourth remote device; and
rejecting the request based upon the fourth device.

9. The method of claim 1, further comprising:
receiving an indication of a recognized user of the second device; and
determining the user identifier based upon the indication of the recognized user.

10. The method of claim 9, wherein recognizing the user comprises recognizing a face of the user.

11. The method of claim 9, wherein recognizing the user comprises recognizing a voice of the user.

12. The method of claim 1, wherein the user identifier from the second device is based upon an authentication at the second device.

13. A system of Bluetooth devices, the system comprising:
a first wireless device to:
pair with a second wireless device;
generate a link key; and
store a second device profile associated with the second wireless device, the second device profile comprising an address of the first wireless device and the link key;
a third wireless device to:
receive a user identifier from user recognition equipment;
in response to receiving the user identifier, initiate a search for the second device profile based on the user identifier;
in response to the search, retrieve the second device profile, the second device profile including the link key;
set an address of the third wireless device to the address of the first wireless device;
receive encrypted data from the second wireless device, the encrypted data addressed to the address of the first wireless device; and
decrypt the received encrypted data from the second wireless device using the link key.

14. The system of claim 13, the third wireless device is further to set a name of the third wireless device, the second device profile comprising the name.

15. The system of claim 13, wherein the search uses a group identifier, the second device profile associated with the group identifier.

16. The system of claim 13, wherein the first wireless device, the second wireless device, and the third wireless device are Bluetooth devices.

17. A non-transitory computer-readable storage media storing computer-executable instructions for connecting a first device to a second device, the stored instructions comprising:
instructions to receive a user identifier from user recognition equipment, the user identifier associated with the second device;
instructions to initiate a search for a second device profile, the second device profile associated with a previous pairing of the second device to a third device, using the user identifier;
instructions to receive the second device profile, the second device profile comprising and address of the third device and a link key, the link key generated by the third device different from the first device;
instructions to set an address of the first device to the third device address; and
instructions to receive encrypted data, the encrypted data encrypted using the link key, from the second device addressed to the third device address.

18. The non-transitory computer-readable storage medium of claim 17, further comprising instructions to decrypt the encrypted data with the link key.

19. The non-transitory computer-readable storage medium of claim 17, further comprising instructions to set a name of the first device, the second device profile comprising the name.

* * * * *